March 26, 1946. H. W. BROLUS 2,397,237
BRAKE FOR RAIL-BORNE VEHICLES
Filed Feb. 26, 1945 2 Sheets-Sheet 1
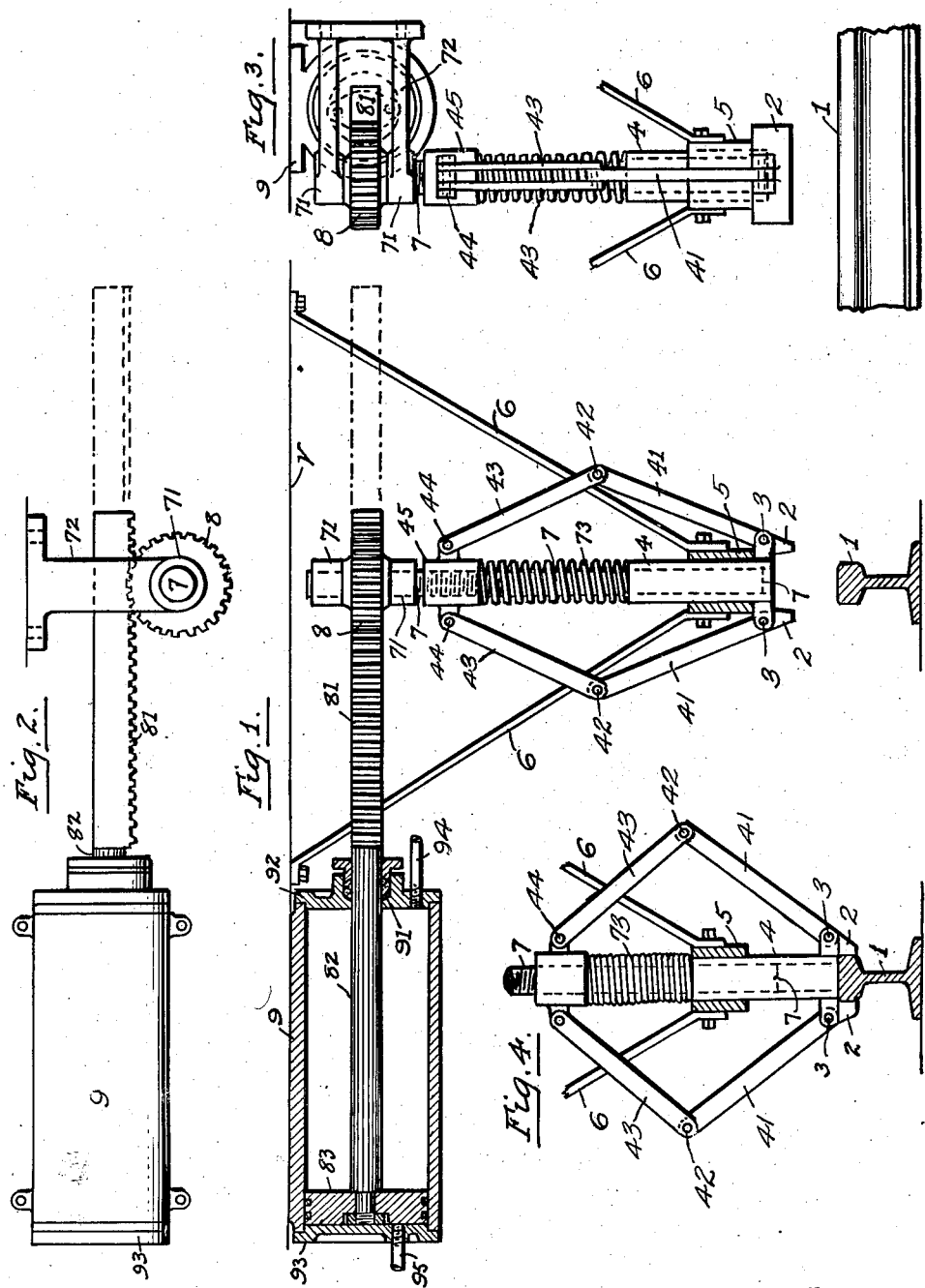
Inventor
Henry W. Brolus

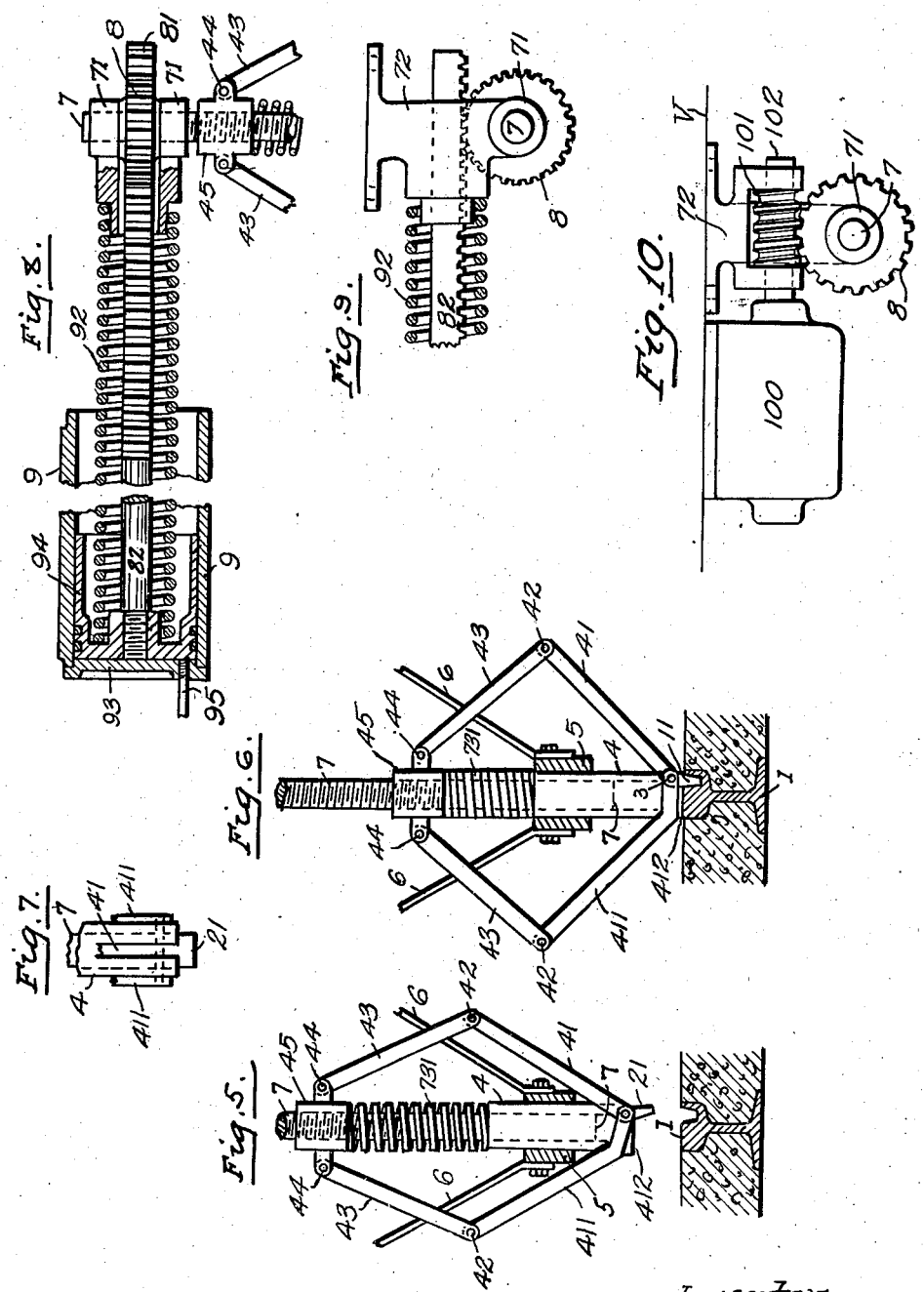

Patented Mar. 26, 1946

2,397,237

UNITED STATES PATENT OFFICE 2,397,237

BRAKE FOR RAIL-BORNE VEHICLES

Henry W. Brolus, Detroit, Mich.

Application February 26, 1945, Serial No. 579,799

4 Claims. (Cl. 188—43)

My invention relates to brakes for vehicles which are adaptable to vehicles of any kind which run upon metallic rails or tracks, and its principal object is to provide a brake which is effective and powerful no matter what condition the rail or track is in.

In brakes of this character as at present employed, the retarding action is produced by some form of mechanism by which one or more of the wheels is seized upon and held more or less stationary. The main difficulty in securing effective stoppage of the vehicle, however, is due to the frequent slippery character of the circular tread of the wheel, which in the case of snow or ice upon the rail causes the vehicle to travel through a considerable distance before coming to a standstill.

According to the present invention the brake mechanism is provided with pairs of jaws for firmly gripping the rail or track itself, and since any required number of pairs may be applied at one time, regardless of the number of wheels, it is evident that there is practically no limit to the braking power obtainable.

In order that my said invention may be readily understood, I will now describe several modifications of the same with reference to the accompanying drawings, in which—

Figure 1 is a side elevation, partly in section, of a single set of brake mechanism adapted to be operated by fluid pressure such as steam, compressed air and the like, the said mechanism being shown about to grip an ordinary railway rail.

Figure 2 is a plan view of the same.

Figure 3 is an end elevation.

Figure 4 is a fragmentary view, corresponding to Figure 1 and showing the mechanism actually gripping the rail.

Figure 5 is a fragmentary side elevation corresponding to Figure 1 showing the mechanism about to grip a rail of the street railway type.

Figure 6 is a similar view showing the mechanism actually gripping the rail.

Figure 7 is a fragmentary end view of the jaws.

Figure 8 is a fragmentary side elevation, partly in section, and corresponding to Figure 1 showing a modified form of pressure cylinder, and Figure 9 is a fragmentary plan view of the same.

Figure 10 is a fragmentary plan view corresponding to Figure 2, but showing the brake mechanism actuated by an electric motor instead of by a fluid pressure cylinder as shown elsewhere.

Like characters designate corresponding parts throughout the several views.

Referring more particularly to Figures 1 to 4 inclusive, the numeral 1 designates a T rail of the ordinary type, as used on railroads. Positioned normally some distance above the rail, so as to safely clear frogs, crossings, etc., are a pair of jaws 2, pivoted as at 3 to a sliding collar 4, which surrounds the shaft 7, and is guided vertically in a square socket 5 which is held in a fixed position on the underside V of the vehicle as by the braces 6. Formed integral with the jaws 2 are a pair of toggle levers 41 which are pivoted at 42 to a pair of depending toggles 43 and the upper ends of the latter are pivoted as at 44 to an internally threaded nut 45.

Threaded within the nut 45 is the upper end of the shaft 7, carried in bearings 71 and held lengthwise by the gear 8 which is fixed firmly to it both longitudinally and rotatively as by keys, not shown. Meshing with the gear 8 is a rack 81 guided in the bracket 72 which also carries the bearings 71. This rack terminates upon the left hand end, as seen in Figure 1, in a circular rod 82 which passes through the stuffing box 91 of the cylinder 9 and is secured to a piston 83 as shown. The cylinder 9 in this case is double-acting, having the end covers 92, 93, and inlet and outlet pipes 94, 95, the latter being connected to a source of pressure supply and provided with suitable controlling valves, not shown.

Assuming the parts to be in the positions shown in Figures 1, 2 and 3, the jaws 2 are held above the rail and are also held outwards by the helical spring 73 which forces the collar 4 away from the nut 45.

On the admission of pressure to the cylinder through the pipe 95, the piston 83, and thus the rod 82, is driven forwards, rotating the gear 8 and consequently the shaft 7, which causes the nut 45 to descend, driving before it the collar 4, until the lower end of the said collar rests upon the top of the rail 1. The downward movement of the nut then continuing, causes the toggles 41, 43 to move outwards to the positions shown in Figure 4, compressing the spring 73, until the jaws 2 firmly grip the sides of the rail head in the manner shown.

It will be observed that a very intense grip may be obtained by the jaws, giving an efficient braking action regardless of the condition of the rail. When it is desired to release the brake, the pressure is released from the pipe 95 and is introduced through the exhaust pipe 94 so as to return the parts to their inactive positions as shown in Figure 1.

When adapting my improved brake to street railway service, in which only one side of the rail is accessible for braking purposes, modifications are made as shown in Figures 5, 6 and 7 of the drawings. In this arrangement a single jaw 21 is employed formed integral with the toggle link 41, while the toggle link 411 is bent, as shown, to provide a shoe 412 which produces a braking action upon the top of the rail while the jaw 21 bears laterally against the inner face of the rail groove, as shown in Figure 6. In this arrangement the spring 731 is formed of square section steel, and so proportioned that it will be pressed up solid, forcing the shoe 412 against the top of the rail, at the same time that the jaw 21 impinges upon the side of the groove.

Figures 8 and 9 of the drawings show the use of a single acting cylinder which replaces the double-acting one above described. The rod 82 in this case is attached to the trunk piston 94 and the pressure is used to apply the brake, while the piston is returned by the compression spring 92, one end of which bears against the piston itself and the other end against the bracket 72. By this arrangement the over-all length of the mechanism is greatly reduced and a saving of weight effected.

It is not deemed necessary here to describe the valves used for operation of the pistons 83 and 94, since the many forms of such valves are well known in the art.

It will be observed from the foregoing description and by reference to the drawings that I have provided a cheap, simple and efficient device which will operate certainly and satisfactorily under all conditions of service and of weather, and while I have herein shown and described some preferred modifications of my invention, it will be understood by those skilled in the art to which the same pertains, that various changes in detail may be made to suit any particular or peculiar requirement without departing from the spirit of the invention as defined in the appended claims.

For example, as shown in Figure 10, when applying my improved brake to electrically propelled vehicles, I may employ an electric motor 100 in place of the power cylinder shown. In this case the gear 8 may be formed as a worm gear and operated by a worm 101 mounted upon the shaft 102 of the motor, using any well-known form of reversing switch gear for operating the same.

Having thus described my said invention, what I claim and desire to secure by Letters Patent of the United States is:

1. A brake for rail-borne vehicles comprising a sliding collar normally held above the level of the rail and carrying at its lower end a pair of jaws adapted to grip the rail head, a shaft positioned above said collar and having its upper end screw-threaded, a nut coacting with the screw thread and connected by toggle linkage with said jaws, a spring between said nut and said collar to normally retain said jaws in their inoperative positions, and means for rotating said shaft to force said jaws into a gripping position.

2. A brake for rail-borne vehicles comprising a sliding collar normally held above the level of the rail and carrying at its lower end a pair of jaws adapted to grip the rail head, a shaft positioned above said collar and having its upper end screw-threaded, a nut coacting with the screw thread and connected by toggle linkage with said jaws, a spring between said nut and said collar to normally retain said jaws in their inoperative positions, and means for rotating said shaft to force said jaws into a gripping position, said means comprising a gear secured to said shaft, a rack meshing with said gear, and fluid pressure means for moving said rack back and forth.

3. A brake for rail-borne vehicles comprising a sliding collar normally held above the level of the rail and carrying at its lower end a pair of jaws adapted to grip the rail head, a shaft positioned above said collar and having its upper end screw-threaded, a nut coacting with the screw thread and connected by toggle linkage with said jaws, a spring between said nut and said collar to normally retain said jaws in their inoperative positions, and means for rotating said shaft to force said jaws into a gripping position, said means comprising a gear secured to said shaft, a rack meshing with said gear, fluid pressure means for moving said rack in one direction to apply the brake and spring means for releasing the same.

4. A brake for rail-borne vehicles comprising a sliding collar normally held above the level of the rail and carrying at its lower end a pair of jaws adapted to grip the rail head, a shaft positioned above said collar and having its upper end screw-threaded, a nut coacting with the screw thread and connected by toggle linkage with said jaws, a spring between said nut and said collar to normally retain said jaws in their inoperative positions, and means for rotating said shaft to force said jaws into a gripping position, said means comprising a gear secured to said shaft, a worm meshing with said gear, and a reversible electric motor for rotating said worm in one direction or the other.

HENRY W. BROLUS.